(12) United States Patent
Cook (10) Patent No.: US 7,882,342 B1
(45) Date of Patent: Feb. 1, 2011

(54) SYSTEMS AND METHODS FOR IMAGING A COMPUTER SYSTEM

(75) Inventor: Randall R. Cook, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 561 days.

(21) Appl. No.: 12/059,791

(22) Filed: Mar. 31, 2008

(51) Int. Cl.
  *G06F 17/30* (2006.01)
(52) U.S. Cl. .............................. 713/1; 713/100; 714/4; 714/6; 707/654
(58) Field of Classification Search .................. 713/1, 713/100; 714/4, 6; 707/654
  See application file for complete search history.

(56) References Cited

U.S. PATENT DOCUMENTS

| | | | |
|---|---|---|---|
| 5,799,147 A | | 8/1998 | Shannon |
| 6,519,687 B2 * | | 2/2003 | Akagi .................... 711/162 |
| 6,785,786 B1 * | | 8/2004 | Gold et al. .............. 711/162 |
| 7,254,682 B1 | | 8/2007 | Arbon |
| 7,809,688 B2 * | | 10/2010 | Cisler et al. ............... 707/654 |
| 2001/0044807 A1 | | 11/2001 | Kleiman et al. |
| 2002/0042833 A1 | | 4/2002 | Hendler et al. |
| 2004/0261091 A1 | | 12/2004 | Cherkasova et al. |
| 2005/0038836 A1 * | | 2/2005 | Wang ..................... 707/204 |
| 2009/0210458 A1 * | | 8/2009 | Glover et al. ............. 707/202 |
| 2010/0132022 A1 * | | 5/2010 | Venkatasubramanian ....... 726/7 |

* cited by examiner

*Primary Examiner*—Abdelmoniem Elamin
(74) *Attorney, Agent, or Firm*—Advantedge Law Group (57) ABSTRACT

A computer-implemented method of imaging a computer system may include taking an image of the computer system that includes those files needed to boot an operating system but excludes at least some of those files that are not needed to boot the operating system. The image may be loaded on a target computer system, which may or may not be the same as the imaged computer system, to enable the target computer system to boot the operating system. Those files that are not needed to boot the operating system may be streamed to the target computer system on an as-needed basis or in the background. Corresponding systems and computer-readable media are also disclosed.

20 Claims, 11 Drawing Sheets

SYSTEMS AND METHODS FOR IMAGING A COMPUTER SYSTEM

BACKGROUND

The advent and widespread use of computers has resulted in a significant increase in user productivity in a variety of settings. Computers are widely used in business, at home, in government, and in many other settings. Computers allow people to accomplish tasks that were previously very time consuming and difficult. Computers have also allowed users to perform additional tasks that were not economically feasible before. The overall impact of computers has been large and positive.

Although computers have provided numerous benefits to society, they also present some challenges. One significant challenge is preventing data loss due to user error, system failure, natural disasters, etc. Many computer users, such as banks, utilities, the military, etc., have data that is irreplaceable. These users typically incorporate data loss recovery solutions into their computer systems to prevent catastrophic data loss. Home users and others can also benefit by implementing a data loss recovery solution.

The most common data loss recovery solution is to regularly back up the data. Backing up data may refer to making copies of data so that these additional copies may be used to restore the original after a data loss event. Backups are useful primarily for two purposes. The first is to restore a computer system to its previous state following a disaster (also known as disaster recovery). The second is to restore small numbers of files after they have been accidentally deleted or corrupted.

One method of backing up a computer system is to take an image of the computer system. Traditional backup programs may back up files such as documents, photos, music, spreadsheets, and the like, on a file-by-file basis. Imaging utilities may do much more. For example, imaging utilities may back up applications, the operating system, and low-level drivers and software. An imagining utility may create a block-by-block (e.g., byte-by-byte, sector-by-sector, cluster-by-cluster, and the like) duplicate of the computer system's storage volume, maintaining the identical data structure. Some imaging utilities can exclude some files and folders from the image.

If the computer system fails, it can be recovered by loading the most recent image, thereby returning the system to the state it was in at the time the image was created. For that matter, if the system becomes unstable because of installed software that won't uninstall cleanly, the image can be loaded with the stable system used a few days earlier.

Imaging software may also perform other functions beyond just backup. For example, the image can be used to clone a single system to multiple computers. The image can also be used as a convenient way to migrate a system to another computer. For example, the image may be transferred to a new computer that uses different hardware without installing the operating system from scratch.

One disadvantage of current imaging solutions is that the images have a tendency to be very large. This increases the bandwidth and network resources necessary to copy and store the images. Ultimately, however, many of the files and data included in the image are never used again when the computer system is restored, cloned, or migrated.

Accordingly, it would be desirable to provide an improved scheme for backing up data with an image. In particular, it would be desirable to minimize the resources necessary to restore, clone, or migrate the computer system.

SUMMARY

A variety of embodiments of methods of imaging a computer system are described herein. The methods involve taking an image of the computer system that includes files that are needed to boot an operating system but excludes files that are not needed to boot the operating system. The image can be loaded on a target computer system to enable the target computer system to boot the operating system. The unneeded files can then be streamed to the target computer system. Also described are exemplary embodiments of computer systems that may be used to implement the methods.

The imaging methods described herein may be used in a variety of ways. For example, the imaging methods may be used to restore the source computer system after a system failure or disaster. In this situation, the target computer system may be the same as the source computer system. The imaging methods may also be used to clone or migrate the source computer system to another computer. In one embodiment, the destination computer may have the same or a very similar hardware architecture as the source computer system. In another embodiment, the destination computer system may have a substantially different hardware architecture than the source computer system.

The imaging methods provide a number of advantages over traditional imaging methods. For example, the size of the image may be greatly reduced since the image does not include many of the files that are not needed to boot the operating system. Since the image is smaller, it may take less time to create. Also, streaming the unnecessary files to the target computer system may reduce network bandwith since many of these files may never need to be streamed.

The image of the source computer system may be taken in any of a number of ways. In one embodiment, a first group of files is identified which includes files that are needed to boot the operating system. A second group of files on the source computer system may include those files that are not needed to boot the operating system. A storage volume may be prepared that includes the first group of files but not the second group of files, and an image may be taken of the storage volume. The second group of files may include a majority of the files on computer system that are not needed to boot the computer system.

The files that are needed to boot the operating system may be identified using a variety of techniques. One way may include booting the operating system and monitoring the file accesses. A list can be created of the files that are accessed as the operating system boots up. The first group of files may include the files on this list. Another way is to have a user select the files needed to boot the operating system from a list. The selected files may be included in the first group of files.

In another example, instead of having the user select files that should be included in the first group of files, the user may select files that should be excluded from the first group of files. The files that were not selected may be included in the first group of files. This last technique may reduce the likelihood of needed files being left out of the first group of files.

The storage volume may be prepared and imaged using any of a number of methods. In one embodiment, the second group of files are moved off the source system to another storage volume. As each one of the second group of files is moved, a link may be placed on the storage volume that points to the new location of the second group of files. The storage volume may then be imaged.

In another embodiment, the storage volume of the source computer system is imaged. The second group of files may be moved off the image to another storage volume and links to the files may be added to the image. The image may then be ready to be deployed.

In yet another embodiment, the source storage volume may be imaged and then the second group of files may be moved to another storage volume. A link to the new location of each one of the second group of files may be stored on the source storage volume in place of the second group of files. A second image may be taken of the source storage volume. The source storage volume may then be restored using the first image. The first image may then be deleted.

The phrase "storage volume" may refer to a fixed amount of storage on a disk, tape, memory stick, or other computer-readable storage medium, which is organized by at least one file system. The term storage volume is sometimes used as a synonym for the storage medium itself, but it is possible for a single disk to contain more than one volume, for example, or for a volume to span more than one disk. The term storage volume does not imply use of any particular storage or processing hardware, any particular file system, any particular operating system, or any particular network. The instant disclosure may operate with, and/or include instances of, various file systems, operating systems, networks, and computer hardware architectures.

The term "deleting" or like words do not necessarily require completely removing all traces of a file's data from storage. It can be sufficient to delete an item by marking the item as being hidden from applications such as word processors, databases, and spreadsheets. Deleting generally refers to marking the allocated space for an item as being available to be written over.

A distinction has been noted above between file-by-file backup approaches, on the one hand, and sector-by-sector/ cluster-by-cluster/other block-by-block approaches, on the other hand. That distinction helps define the terms "image," "imaging," and "imaged" in the claims and elsewhere in this document. A file-by-file approach is not an "image" for purposes of this disclosure, regardless of whether the term image is used in other documents to describe file-by-file backup results.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As described in greater detail below, this disclosure generally relates to systems and methods for imaging a computer system. Detailed examples are discussed of methods for taking the image, methods for identifying files that are needed to boot an operating system and files that are not needed to boot an operating system, methods for preparing the storage volume of the computer system to be imaged, and methods for deploying or loading the image on a target computer system. It should be appreciated that the embodiments described herein are exemplary in nature and are not meant to be an exhaustive description of all possible configurations, features, and advantages.

FIGS. 1-11 illustrate various embodiments of the system and methods for imaging a computer system. The invention may be embodied in methods, in storage media configured to perform methods, and in systems, for example. Although the focus of the discussion is on methods, it should be appreciated that much of what is said about method embodiments also helps explain configured medium and system embodiments, and vice versa.

An exemplary computing system 1010 that may be imaged is described in greater detail below in connection with FIG. 10. Computing system 1010 may include an imaging module. The imaging module may represent one or more software applications or programs that, when executed by a computing device, may cause the computing device to perform one or more tasks required to image computing system 1010 or restore the image to the computing system 1010 or another computer system. For example, the imaging module may represent one or more software modules configured to run on one or more computing devices, such as clients 902, 904, 906 and server 910 in FIG. 9, computing system 1010 in FIG. 10, and/or portions of exemplary network architecture 1100 in FIG. 11.

Figure 9:
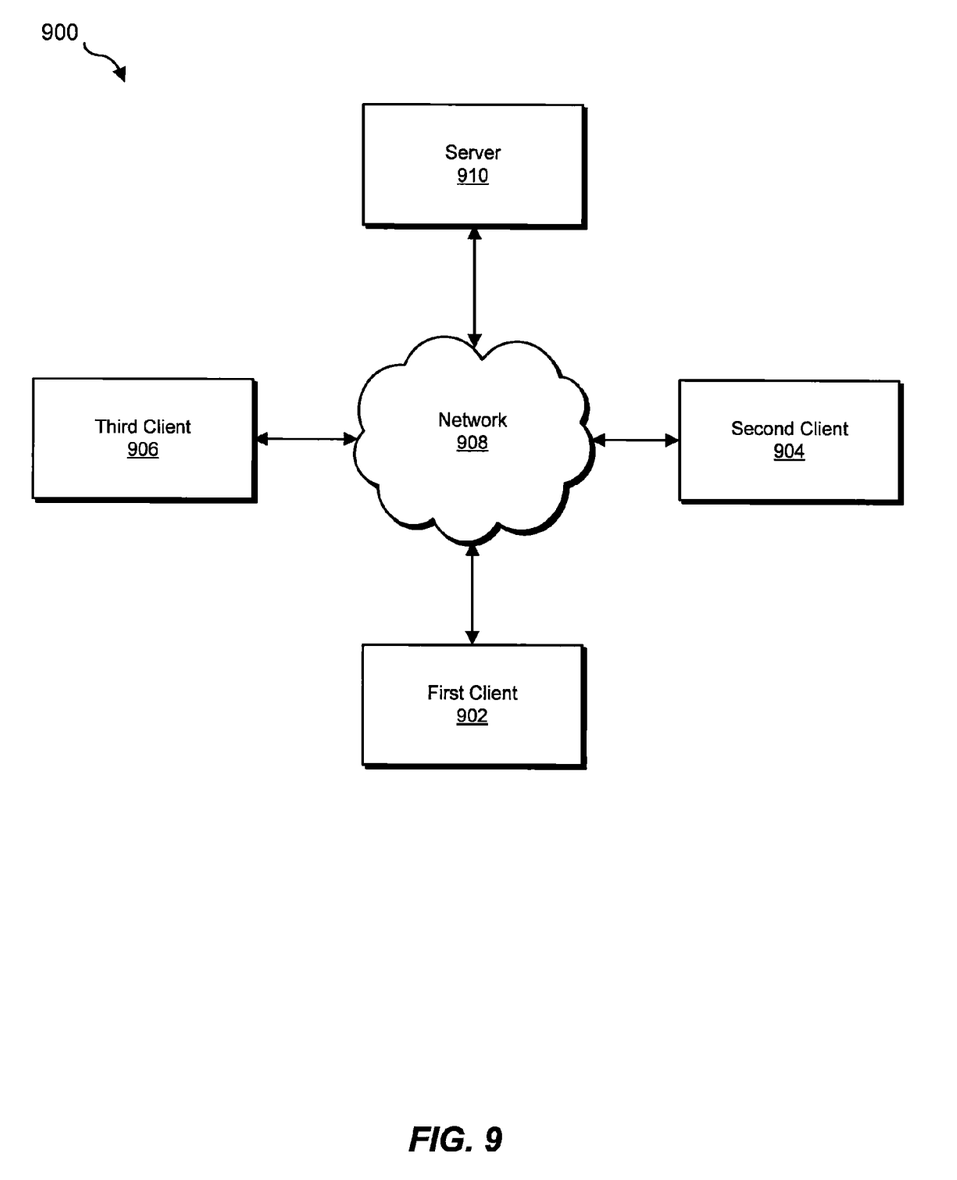
FIG. 9 is a block diagram of an exemplary network-based system for taking an image of a source computer system and loading the image on a target computer system.

The storage volumes referred to herein may represent one or more hardware storage devices that are mounted to clients 902, 904, and 906 and/or server 910 in FIG. 9, as well as storage devices 1032 and 1033 mounted to computing system 1010. The storage volumes may also refer to storage devices such as SAN 1180, for example, that is part of exemplary network architecture 1100 in FIG. 11.

Computing system 1010 may have a wide variety of configurations. In one embodiment, computing system 1010 includes an operating system such as any of the WINDOWS family of operating systems, LINUX, UNIX, and so forth. The number and variety of different operating systems that may be installed on computing system 1010 is large.

The computer system that is being imaged, sometimes referred to herein as the source computer system, may be deployed in a variety of ways. For example, all or a portion of computing system 1010 may represent portions of a network-based system. FIG. 9 is an illustration of an exemplary network-based system 900 for taking an image of computing system 1010, which may be any of clients 902, 904, and 906, as well as server 910 in FIG. 9. As illustrated in this figure, system 900 may include a first client 902, a second client 904, and a third client 906, all of which may be in communication with a server 910 by way of network 908.

Clients 902, 904, and 906 generally represent any type or form of client-side computing device, such as a user's computing device, capable of executing computer-readable instructions. In certain embodiments, clients 902, 904, and 906 comprise one or more portions of computing system 1010 shown in FIG. 10. For example, an imaging module may be stored and configured to run on any one of clients 902, 904, and 906.

As shown in FIG. 9, clients 902, 904, and 906 may communicate with server 901 via network 908. Network 908 generally represents any type or form of communication or computing network including, for example, an intranet, a wide area network (WAN), a local area network (LAN), a personal area network (PAN), or the Internet.

System 900 may also comprise a server 910. Server 910 generally represents any type or form of server-side computing device, such as a backend. In certain embodiments, server 910 may comprise one or more portions of computing system 1010. For example, an imaging module may be stored and configured to run on server 910.

Figure 1:
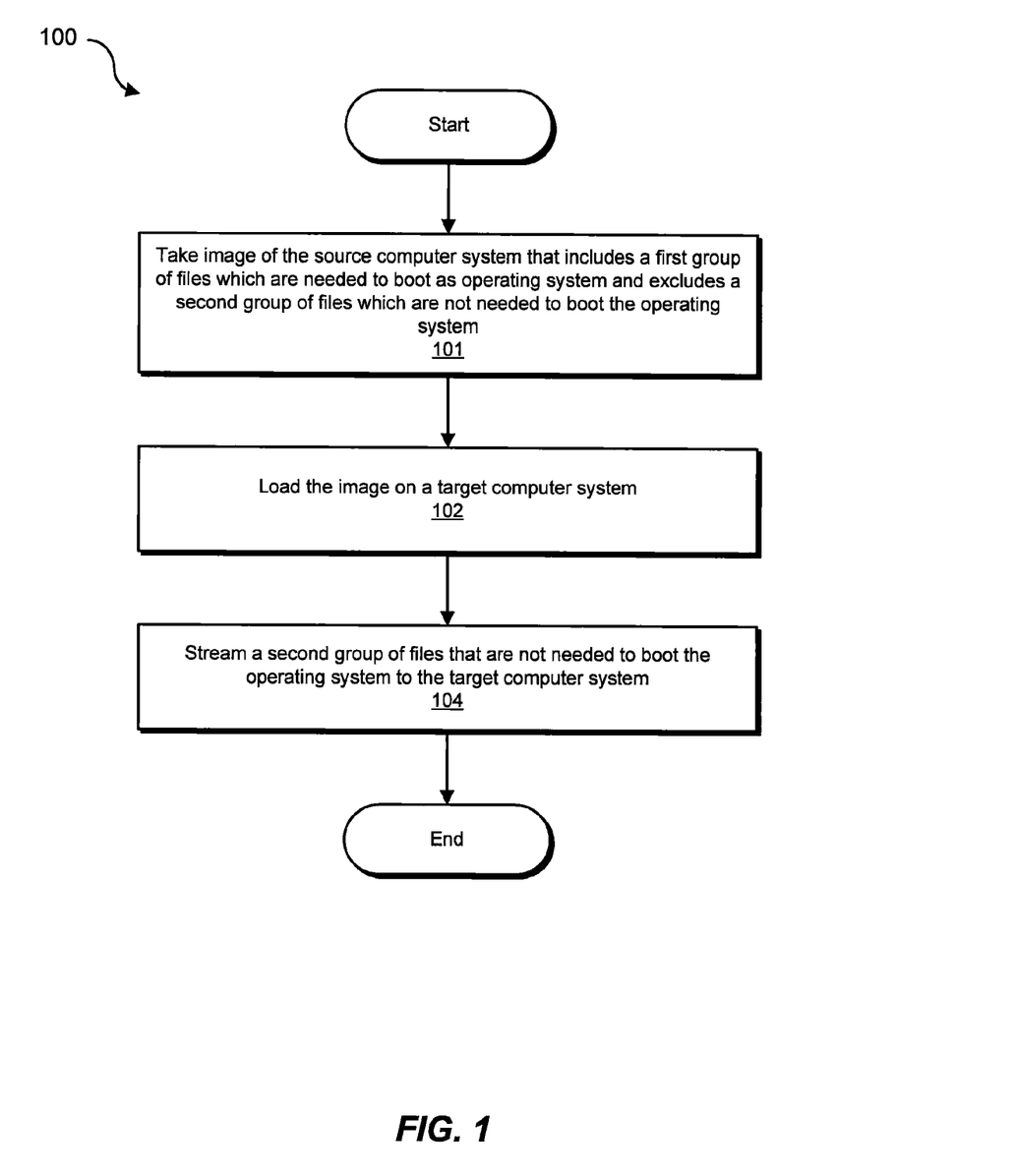
FIG. 1 is a flow diagram of an exemplary computer-implemented method of taking an image of a source computer system having a source storage volume and loading the image on a target computer system.

FIG. 1 shows a flow diagram of an exemplary computer-implemented method 100 for imaging a source computer system and loading the image on a target computer system. As illustrated in this figure, at step 101, an image may be taken of the source computer system that includes a first group of files that are needed to boot the operating system. In this embodiment, the image does not include a second group of files on the source computer system that are not needed to boot the operating system. The second group of files may be backed up separately on another storage volume. In one embodiment, the second group of files is backed up using a file-by-file process.

The image of the source computer may be taken by copying all of the data to another storage volume. As mentioned above, the data may be copied using a low level block-by-block type process. Even though the image is taken at a low level, in some embodiments, it may be possible to selectively exclude files and/or folders from this process. For example, the imaging module may be configured to allow the user to select files and/or folders that will not be included in the image.

It may be somewhat difficult and impractical to completely separate files needed to boot the operating system from files that are not needed to boot the operating system. It is likely that some files that are not needed to boot the operating system will be included with the first group of files that are needed to boot the operating system and are in the image. However, in some embodiments, the files may be completely separated.

A less likely, but plausible, scenario is that some files needed to boot the operating system may be included with the second group of files that are not in the image. However, the first group of files may include all, or at least substantially all, of those files that are needed to boot the operating system.

In one embodiment, the second group of files includes a majority of the files on the source computer system that are being imaged and/or backed up and are not needed to boot the operating system. In another embodiment, the second group of files includes at least 65% of the files on the source computer system that are being imaged and/or backed up and are not needed to boot the operating system. In yet another embodiment, the second group of files includes at least 75% of the files on the source computer system that are being imaged and/or backed up and are not needed to boot the operating system. In yet another embodiment, the second group of files includes at least 85% of the files on the source computer system that are being imaged and/or backed up and are not needed to boot the operating system.

At step 102 in FIG. 1, the image may be loaded on a target computer system. The target computer system may be the same as the source computer system if, for example, the source computer system needs to be restored after a system failure. The target computer system may also be another computer system if, for example, the source computer system is cloned or migrated to another computer. The target computer system may have a similar hardware architecture as the source computer system or may have a different hardware architecture than the source computer system.

After the image has been loaded on the target computer system, the target computer system may be capable of running the operating system. However, the second group of files that are not needed to boot the operating system may still be stored in a separate storage volume. The image may include links to the second group of files so that when a file is needed, it may be immediately streamed to the target computer system. The second group of files may be streamed to the target computer system either on-demand or in the background when the target computer system is otherwise idle. To the user, the target computer system may look like a copy of the source computer system even though many of the second group of files are not stored on the target computer system until they are needed, at which time they may be streamed to the target computer system.

Any suitable streaming protocol may be used to stream the second group of files to the target computer system. Some examples of suitable streaming protocols include transmission control protocol (TCP), user datagram protocol (UDP), real-time streaming protocol (RTSP), real-time transport protocol (RTP), and so forth. It is contemplated that future streaming protocols and methods may also be used to deliver the second group of files to the target computer system.

Figure 2:
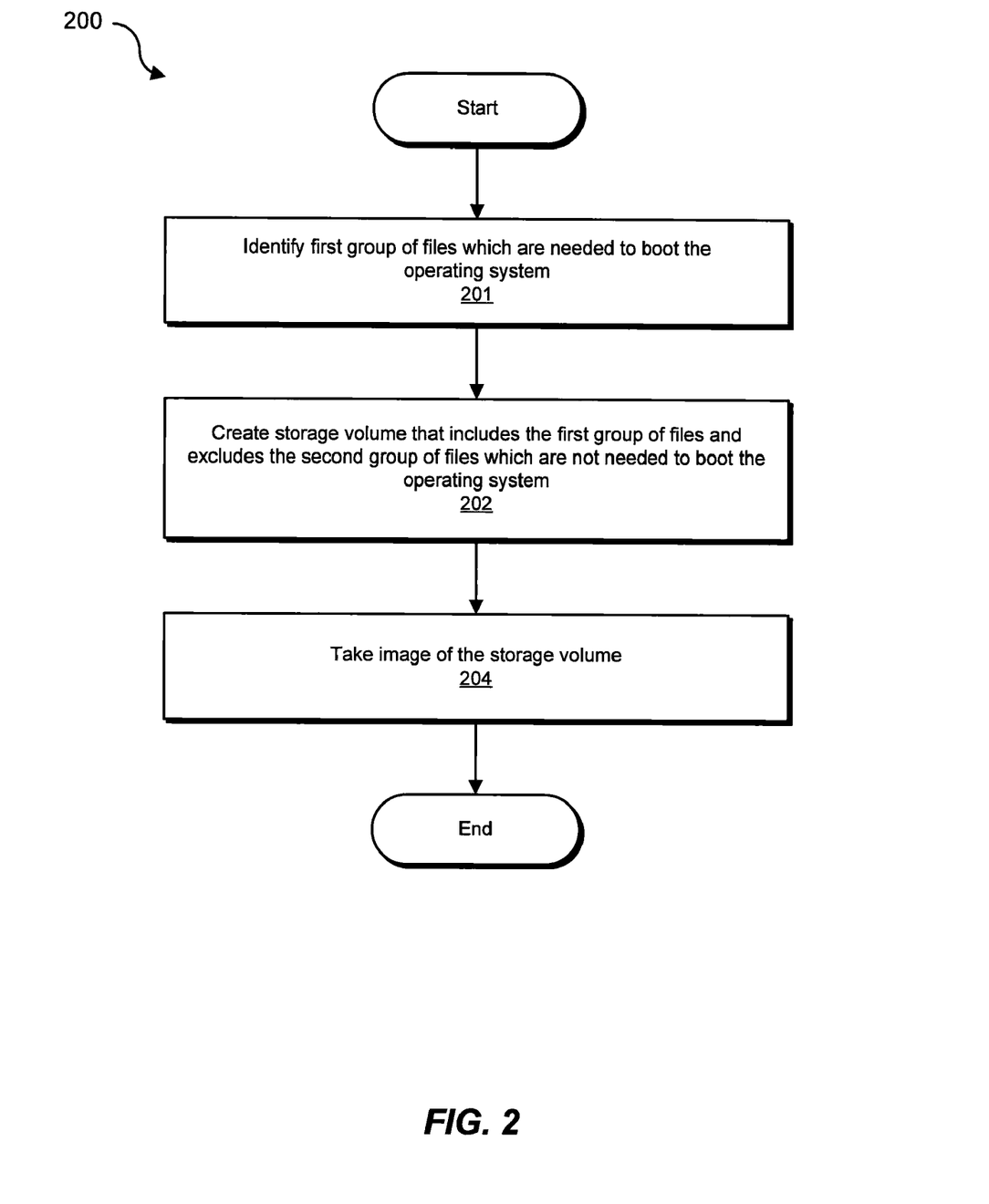
FIG. 2 is a flow diagram of an exemplary computer-implemented method of taking an image of a source computer system.
Figure 3:
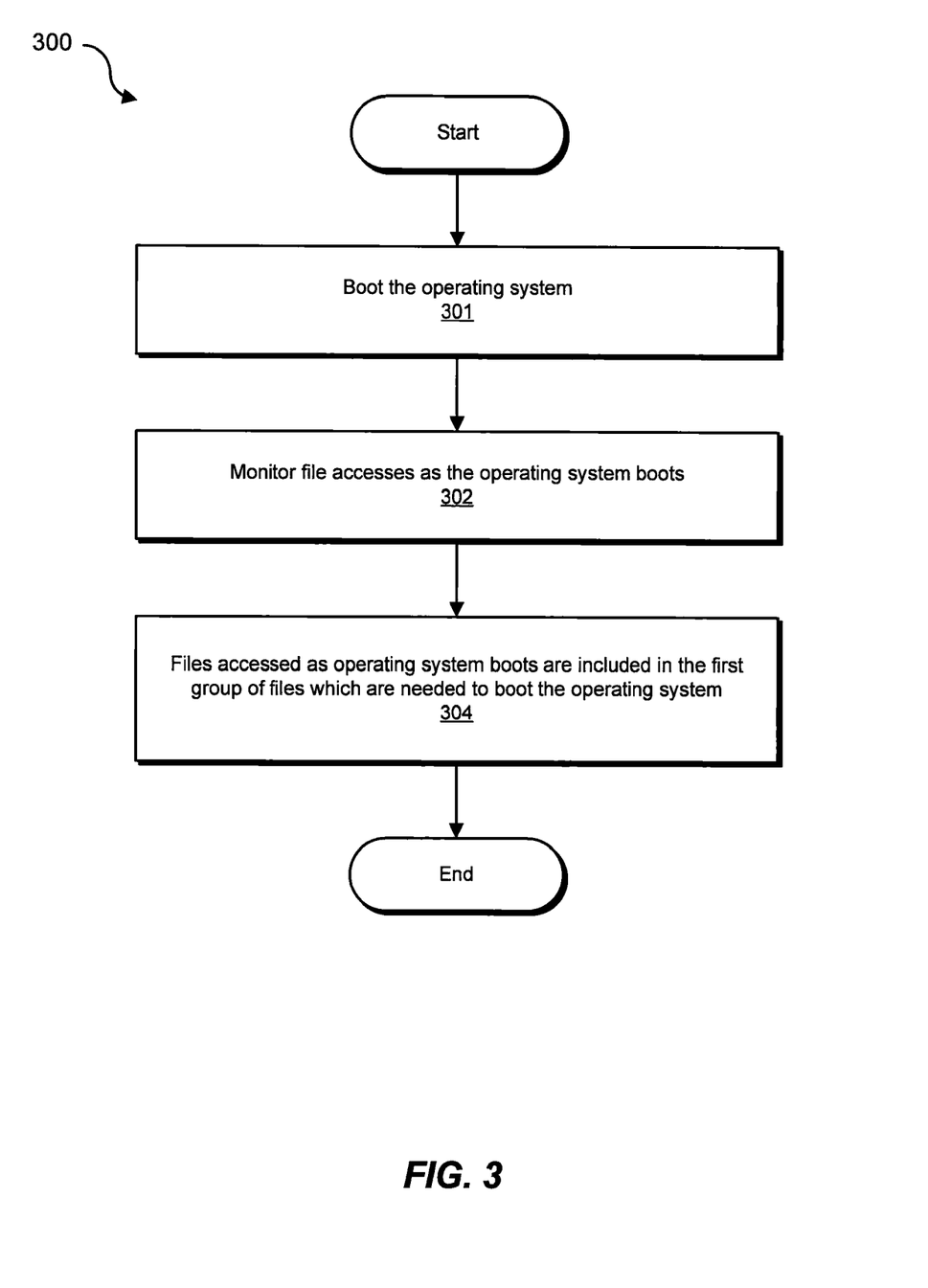
FIGS. 3-5 are flow diagrams of exemplary computer-implemented methods of identifying files that are needed to boot an operating system on the source computer system.
Figure 4:
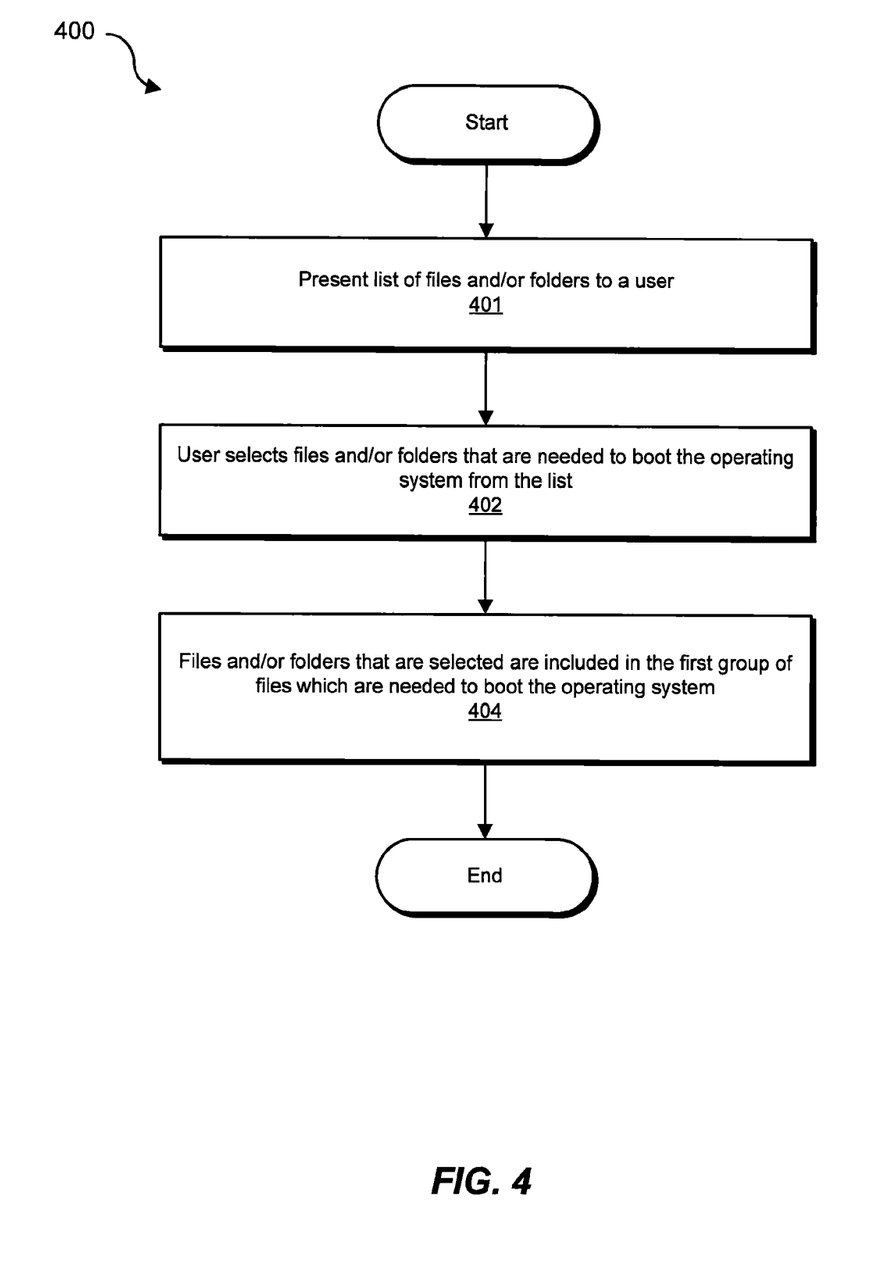
Figure 5:
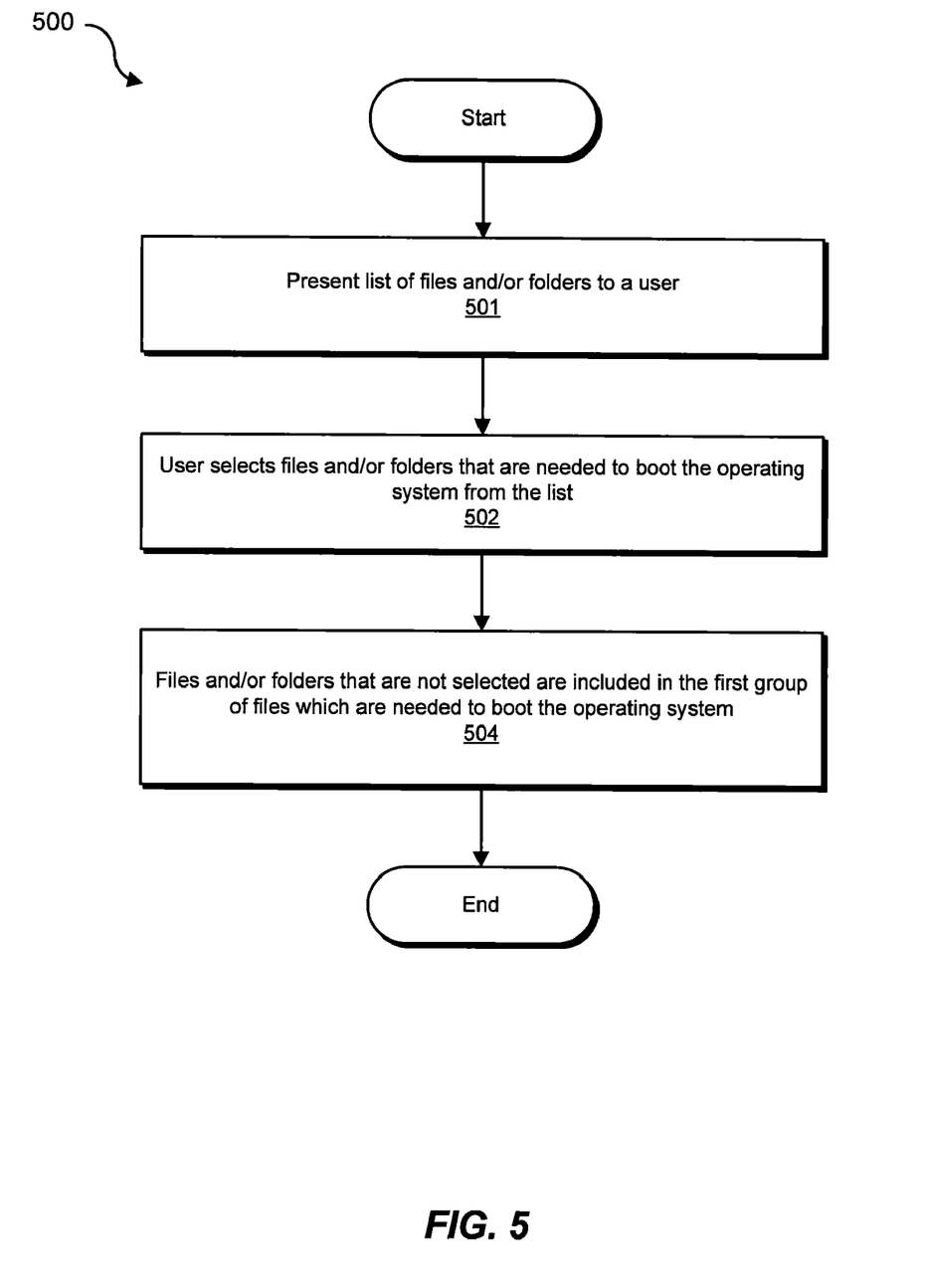

Turning to FIG. 2, one embodiment of a computer-implemented method 200 is shown that can be used to take the image referred to in step 101. In this embodiment, at step 201 files that are needed to boot the operating system may be identified. FIGS. 3-5 show flow diagrams of various embodiments of computer-implemented methods 300, 400, and 500 to identify the files on the source computer system that are needed to boot the operating system.

In one embodiment, illustrated in FIG. 3, the files that are needed to boot the operating system are identified by booting the operating system at step 301 and monitoring file accesses at step 302. Those files that are accessed as the operating system boots may be included in the first group of files, as illustrated by step 304. Method 300 may be advantageous because it requires minimal user input and effort.

In another embodiment, illustrated in FIG. 4, the files that are needed to boot the operating system may be identified by having the user select the files. At step 401, a list of files and/or folders may be presented to the user. The user may then select those files and/or folders that are needed to boot the operating system at step 402. The selected files and/or folders may be included with the first group of files at step 404. It should be appreciated that step 401 may be skipped or the other steps may be altered in any suitable fashion.

The risk of using method 400 of FIG. 4 is that the user may fail to select all of the needed files. Such an error may make it impossible to boot the operating system from the image. The method 500 shown in FIG. 5 solves or at least minimizes this problem by presenting the user with a list of the files on the source computer system at step 501 (optional) and having the user select those files that are not needed to boot the operating system at step 502. Those files that are not selected may be included in the first group of files, as shown by step 504. The advantage of this method is that the user can include files in the image when the user is unsure whether they are needed to boot the operating system.

Any combination of methods 300, 400, and 500 may also be used to identify files that are needed to boot the operating system. For example, method 300 may be used to identify an initial group of files that are needed to boot the operating system. Method 500 can then be used to identify files that the user would like to include in the second group of files. The user may be prevented from adding the files identified by performing method 300 to the list of the second group of files. This may be done by hiding the files so that they are not included on the list presented to the user or by making them visible but unselectable.

Figure 6:
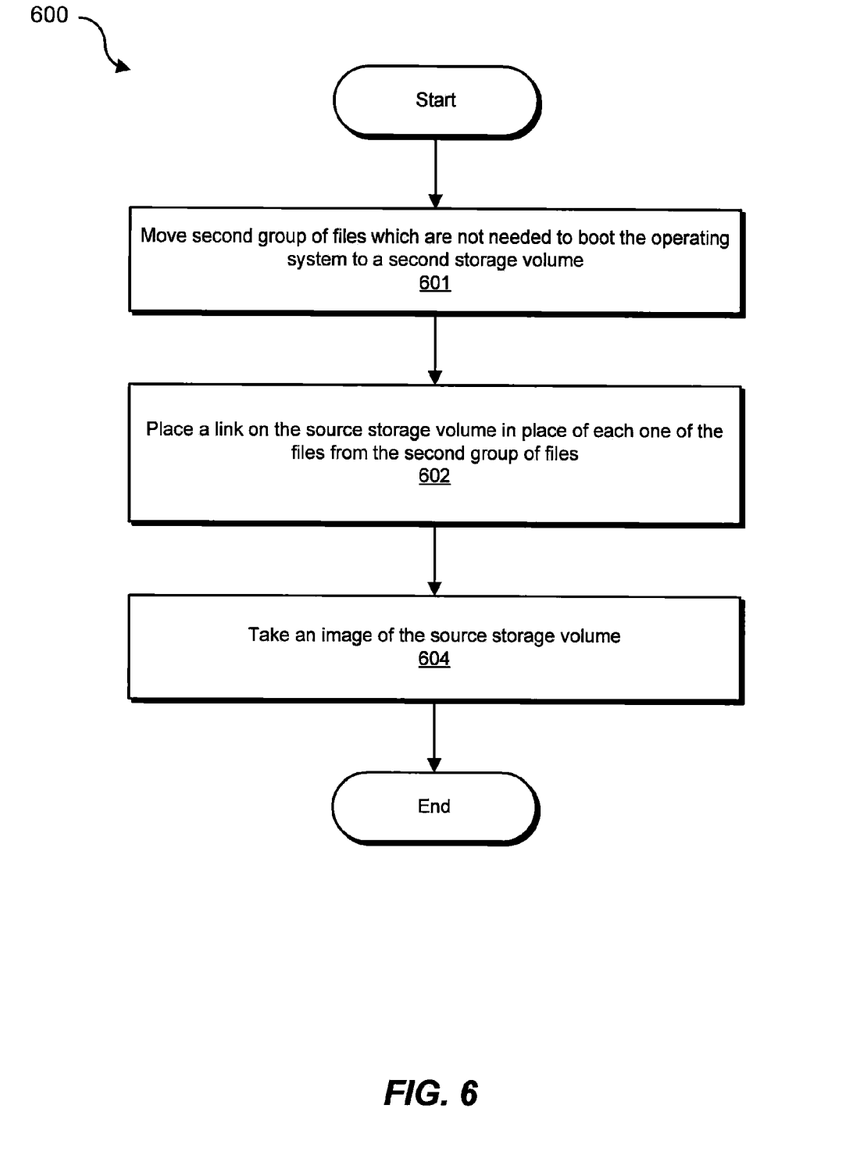
FIGS. 6-8 are flow diagrams of exemplary computer-implemented methods of preparing and imaging a storage volume to include a first group of files that are needed to boot the operating system and not include a second group of files that are not needed to boot the operating system.
Figure 7:
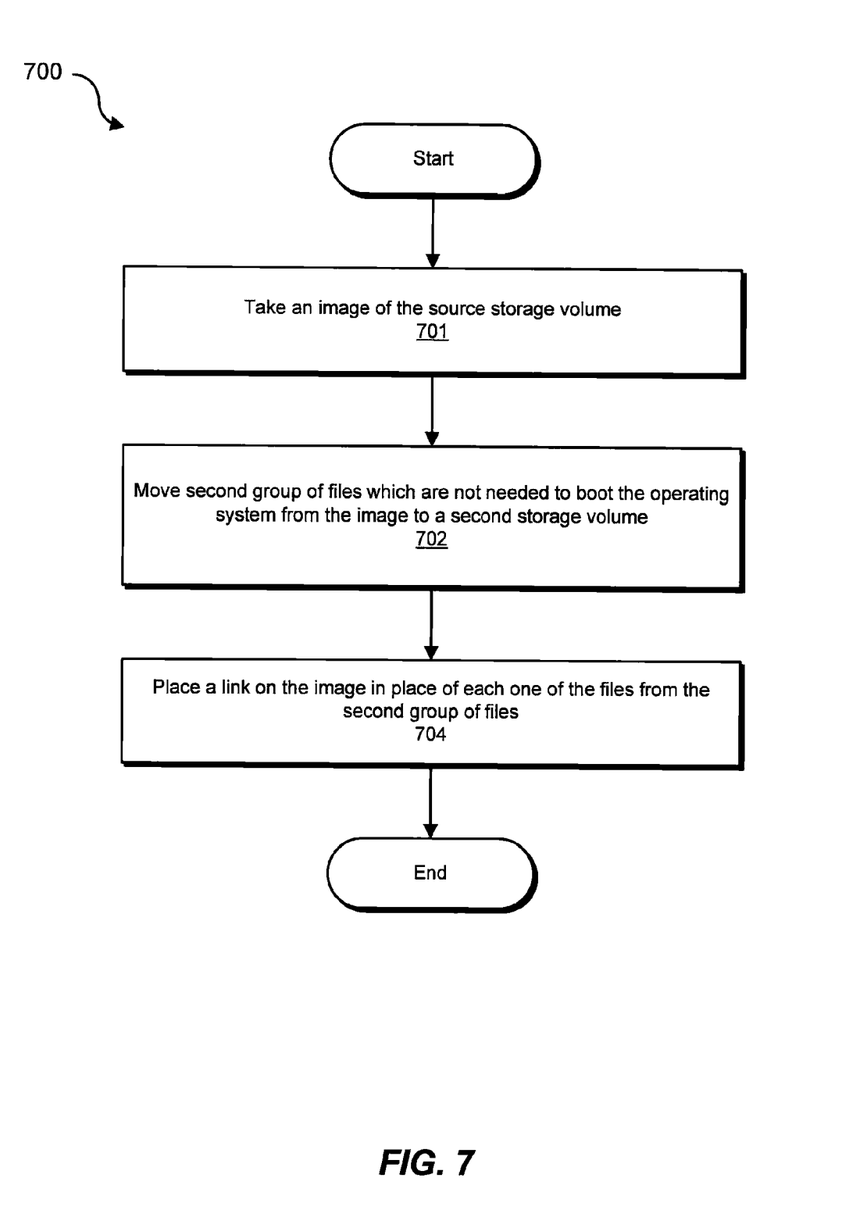
Figure 8:
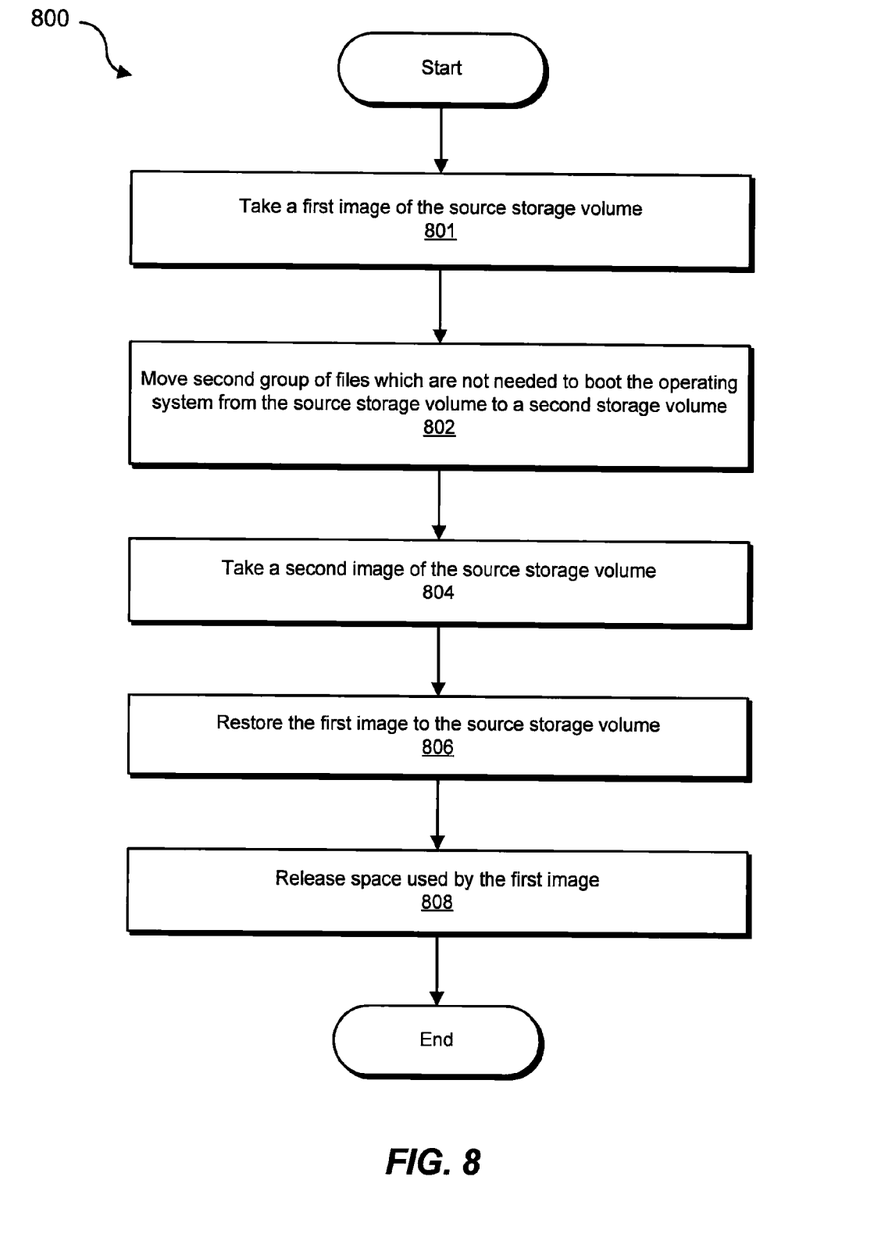

Turning back to FIG. 2, once the files that are needed to boot the operating system have been identified, at step 202 a storage volume that includes the first group of files and excludes the second group of files may be prepared. The storage volume may then be imaged in step 204. FIGS. 6-8 show flow diagrams of methods 600, 700, and 800 that may be used to prepare and image the storage volume.

In method 600 shown in FIG. 6, at step 601 the files in the second group of files may be moved from the source storage volume to a second storage volume, such as a network storage volume. As the files are moved, links may be provided on the source storage volume at step 602 that point to the location of the files on the second storage volume. The links may allow the source computer system to initialize the streaming process of selected files from the second group of files when such files are needed by the source computer system or when the source computer system is idle. With the second group of files removed from the source storage volume, an image may be taken at step 604.

Method 700 shown in FIG. 7 is another embodiment of a suitable method that may be used to prepare and image the source storage volume. Unlike method 600 of FIG. 6, method 700 does not require data to be deleted or moved off the source storage volume. Instead, the only interaction with the source storage volume occurs at step 701 when it is imaged. At step 702, the image may be manipulated to move the second group of files to another storage volume, such as a network storage volume. Links to the second group of files may be included on the image as shown at step 704. The image is now ready to be loaded on a target computer system, if such action is necessary.

Method 800, shown in FIG. 8, is similar to the method 600 except that method 800 is designed to return the source storage volume to its original state once the backup image has been created. Method 800 begins at step 801 by taking a first image of the source storage volume. At step 802, the second group of files may be moved from the source storage volume to a second storage volume, such as a network storage volume (links may be added to the source storage volume). At step 804, a second image may be taken of the source storage volume. The second image may be the image that is used to backup the source storage volume. At step 806, the source storage volume may be restored to its original state by loading the first image on it. At step 808, the first image may be deleted.

In one embodiment, method 100 shown in FIG. 1 may be implemented in a network environment, such as that shown in FIG. 9. The source computer system may be first client 902. The image that is taken at step 101 may be transferred to server 910. Also, the second group of files that are not included in the image may be sent to server 910. The image can be loaded on any of first client 902 (e.g., system restore), second client 904, or third client 906 (e.g., cloning and migration of the source computer system) via network 908. Once the image has been loaded, the second group of files can be streamed from server 910 to corresponding client 902, 904, and/or 906 as needed.

It should be appreciated that the image and the second group of files may each be stored on separate servers. For example, the second group of files may be stored on a server that is primarily used for streaming purposes while the image may be stored on a separate server. Numerous other embodiments are also contemplated for storing and distributing the image and the second group of files.

Figure 10:
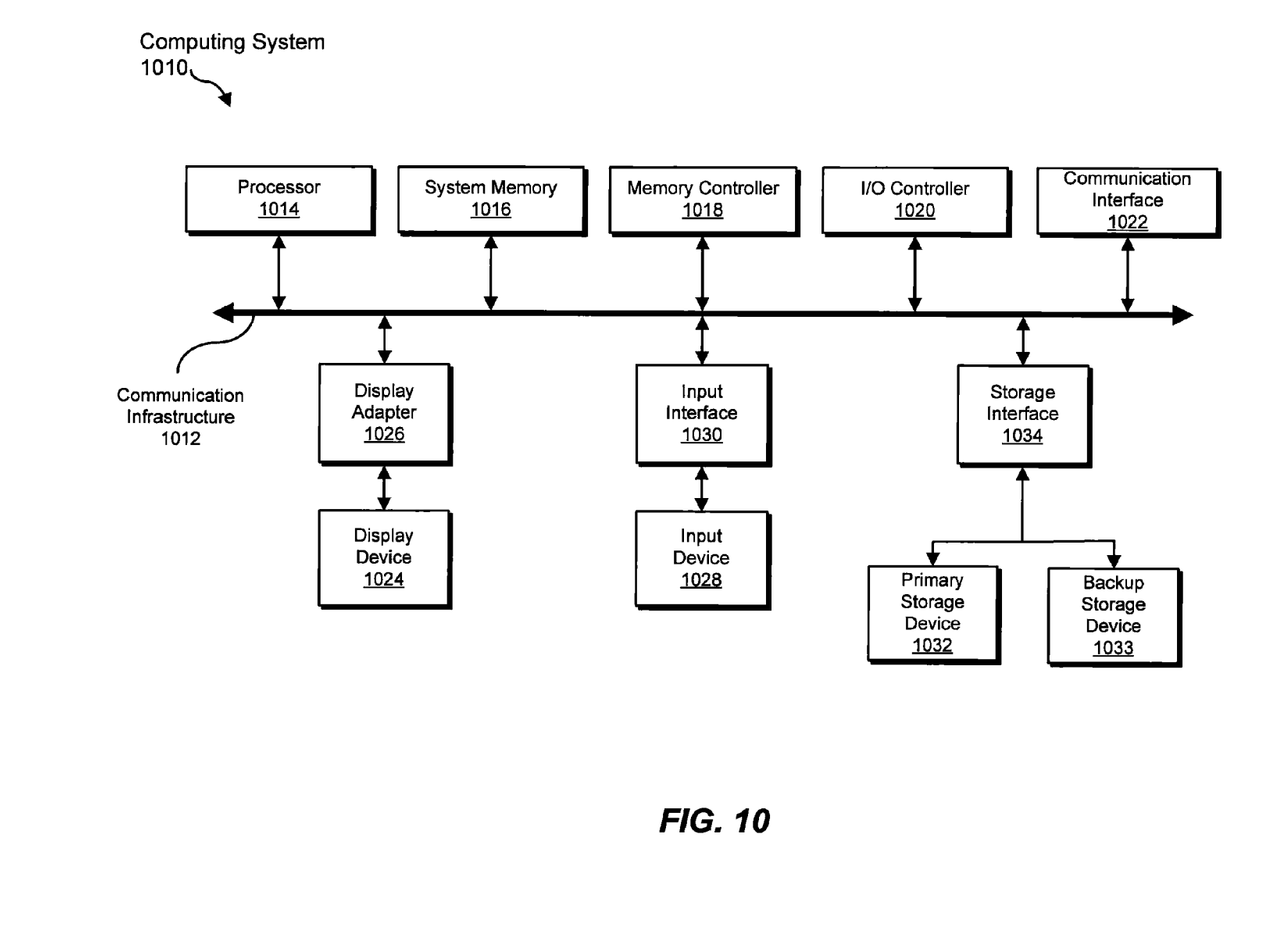
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may comprise at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the loading, streaming, imaging, identifying, transferring, monitoring, selecting, moving, and taking steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may comprise both a volatile memory unit (such as, for example, system memory 1016) and a non-volatile storage device (such as, for example, primary storage device 1032, as described in detail below).

In certain embodiments, exemplary computing system 1010 may also comprise one or more components or elements in addition to processor 1014 and system memory 1016. For example, as illustrated in FIG. 10, computing system 1010 may comprise a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller may perform and/or be a means for performing, either alone or in combination with other elements, one or more of the steps or features described and/or illustrated herein, such as loading, streaming, imaging, identifying, transferring, monitoring, selecting, moving, and taking.

I/O controller 1020 generally represents any type or form of module capable of coordinating and/or controlling the input and output functions of a computing device. For example, in certain embodiments I/O controller may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the loading, streaming, imaging, identifying, transferring, monitoring, selecting, moving, and taking steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network comprising additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the loading, streaming, imaging, identifying, transferring, monitoring, selecting, moving, and taking steps disclosed herein. Communication interface 1022 may also be used to perform and/or be a means for performing other steps and features set forth in the instant disclosure.

As illustrated in FIG. 10, computing system 1010 may also comprise at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also comprise at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the loading, streaming, imaging, identifying, transferring, monitoring, selecting, moving, and taking steps disclosed herein. Input device 1028 may also be used to perform and/or be a means for performing other steps and features set forth in the instant disclosure.

As illustrated in FIG. 10, exemplary computing system 1010 may also comprise a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also comprise other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, the exemplary file systems disclosed herein may be stored on primary storage device 1032, while the exemplary file-system backups disclosed herein may be stored on backup storage device 1033. Storage devices 1032 and 1033 may also be used, for example, to perform and/or be a means for performing, either alone or in combination with other elements, one or more of the loading, streaming, imaging, identifying, transferring, monitoring, selecting, moving, and taking steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 10 need not be present to practice the embodiments descried and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

Figure 11:
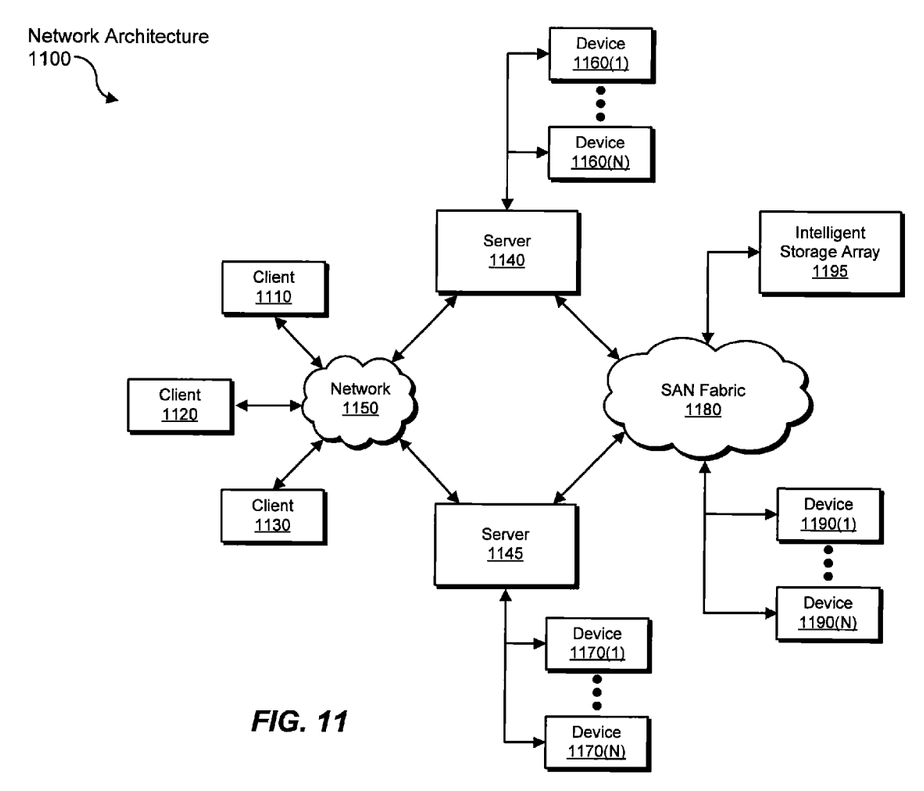
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or to run certain software applications. Network 1150 generally represents any telecommunication or computer network; including, for example, an intranet, a wide area network (WAN), a local area network (LAN), a personal area network (PAN), or the Internet.

As illustrated in FIG. 11, one or more storage devices 1160(1)-(N) may be directly attached to server 1140. Similarly, one or more storage devices 1190(1)-(N) may be directly attached to server 1145. Storage devices 1160(1)-(N) and storage devices 1190(1)-(N) generally represent any type or form of storage device or medium capable of storing data and/or other computer-readable instructions. In certain embodiments, storage devices 1160(1)-(N) and storage devices 1190(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the loading, streaming, imaging, identifying, transferring, monitoring, selecting, moving, and taking steps disclosed herein. Network architecture 1100 may also be used to perform and/or be a means for performing other steps and features set forth in the instant disclosure.

As detailed above, computing system 1010 and/or one or more of the components of network architecture 1100 may perform and/or be a means for performing, either alone or in combination with other elements, one or more steps of the exemplary methods described and/or illustrated herein. For example, one computer-implemented method of imaging a computer system may comprise taking an image of the computer system. The computer system may include a first group of files comprising files needed to boot an operating system and a second group of files comprising a majority of files on the computer system that are not needed to boot the operating system. The image may include the first group of files and not the second group of files. The method may also include loading the image on a target computer system to enable the target computer system to boot the operating system and streaming the second group of files to the target computer system.

In additional embodiments, the method may include some of the following features. The image may include links to the second group of files. The files from the second group of files may be streamed to the target computer system on an as-needed basis. The files from the second group of files may be streamed to the target computer system in the background depending on the usage level of the target computer system. The method may comprise identifying the files that are needed to boot the operating system by monitoring file accesses as the computer system boots up. The method may comprise identifying the files that are needed to boot the operating system by selecting the files from a list. The computer system and the target computer system may be the same. The method may comprise transferring the image and the second group of files to a server and streaming the second group of files from the server to the target computer system.

In another embodiment, a computer-implemented method of imaging a computer system comprises identifying a first group of files on the computer system that includes files needed to boot an operating system and taking an image of the computer system. The computer system may also include a second group of files that comprises files that are not needed to boot the operating system. The image may include the first group of files and may not include the second group of files. The second group of files may include a majority of the files on the computer system that are not needed to boot the operating system.

The foregoing method may also include any of the following features. The files that are needed to boot the operating system may be identified by monitoring file accesses as the computer system boots up. The files that are needed to boot the operating system may be identified by selecting the files from a list. The files that are needed to boot the operating system may be identified as the files left after the files that are not needed to boot the operating system have been selected from a list. The image may include links to the second group of files.

Taking the image may include moving the second group of files off the computer system to a storage volume and taking an image of the computer system. Moving the second group of files may include transferring the second group of files to a server. Taking the image may include taking an image of the computer system that includes the first group of files and the second group of files and moving the second group of files off the image to a storage volume. The image may be a second image and taking the second image may include taking a first image of the computer system that includes the first group of files and the second group of files, moving the second group of files off the computer system, imaging the computer system to create the second image, and loading the first image on the computer system. The method may comprise loading the image on a target computer system to enable the target system to boot the operating system and streaming the second group of files to the target computer system so that the target computer system is an at least substantial reproduction of the computer system.

In another embodiment, a computer-implemented method of imaging a computer system comprises taking an image of the computer system. The computer system may include a first group of files comprising files needed to boot an operating system and a second group of files comprising a majority of files on the computer system that are not needed to boot the operating system. The image may include the first group of files and not the second group of files, and the image may include links to the second group of files. The method may further include loading the image on a target computer system to enable the target computer system to boot the operating system and streaming the second group of files to the target computer system. The target computer system may be an at least substantial reproduction of the computer system. The second group of files may be streamed to the target computer system on an as-needed basis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for imaging a computer system, comprising:
   taking an image of the computer system, the computer system comprising a first group of files comprising files on the computer system that are needed to boot an operating system and a second group of files comprising a majority of files on the computer system that are not needed to boot the operating system, the image comprising the first group of files and not the second group of files;
   loading the image on a target computer system to enable the target computer system to boot the operating system; and
   streaming the second group of files to the target computer system.

2. The method of claim 1, wherein the image comprises links to the second group of files.

3. The method of claim 1, wherein files from the second group of files are streamed to the target computer system on an as-needed basis.

4. The method of claim 1, wherein files from the second group of files are streamed to the target computer system in the background depending on the usage level of the target computer system.

5. The method of claim 1, further comprising identifying the files that are needed to boot the operating system by monitoring file accesses as the computer system boots up.

6. The method of claim 1, further comprising identifying the files that are needed to boot the operating system by receiving a list of the files that are needed to boot the operating system from a user.

7. The method of claim 1, wherein the computer system and the target computer system are the same.

8. The method of claim 1, further comprising transferring the image and the second group of files to a server and streaming the second group of files from the server to the target computer system.

9. A computer-implemented method for imaging a computer system, comprising:
   identifying a first group of files on the computer system that comprises files on the computer system that are needed to boot an operating system and a second group of files that comprises files on the computer system that are not needed to boot the operating system; and
   taking an image of the computer system that includes the first group of files and does not include the second group of files;
   wherein the second group of files comprises a majority of the files on the computer system that are not needed to boot the operating system.

10. The method of claim 9, wherein the files that are needed to boot the operating system are identified by monitoring file accesses as the computer system boots up.

11. The method of claim 9, wherein the files that are needed to boot the operating system are identified by receiving a list of the files that are needed to boot the operating system from a user.

12. The method of claim 9, wherein the files that are needed to boot the operating system are identified by:
   receiving a list of the files that are not needed to boot the operating system from a user;
   identifying any remaining files on the computer system.

13. The method of claim 9, wherein the image comprises links to the second group of files.

14. The method of claim 9, wherein taking the image comprises moving the second group of files off the computer system to a storage volume and taking an image of the computer system.

15. The method of claim 14 wherein moving the second group of files comprises transferring the second group of files to a server.

16. The method of claim 9, wherein taking the image comprises taking an image of the computer system that comprises the first group of files and the second group of files and moving the second group of files off the image to a storage volume.

17. The method of claim 9, wherein the image is a second image and taking the second image comprises taking a first image of the computer system that comprises the first group of files and the second group of files, moving the second group of files off the computer system, imaging the computer system to create the second image, and loading the first image on the computer system.

18. The method of claim 9, comprising loading the image on a target computer system to enable the target system to boot the operating system and streaming the second group of files to the target computer system so that the target computer system is an at least substantial reproduction of the computer system.

19. A computer-implemented method of imaging a computer system, comprising:
   taking an image of the computer system, the computer system including a first group of files comprising the files on the computer system needed to boot an operating system and a second group of files comprising a majority of the files on the computer system that are not needed to boot the operating system, the image including the first group of files and not the second group of files, wherein the image includes links to the second group of files;
   loading the image on a target computer system to enable the target computer system to boot the operating system; and
   streaming the second group of files to the target computer system;
   wherein the target computer system is an at least substantial reproduction of the computer system.

20. The method of claim 19, wherein the second group of files are streamed to the target computer system on an as-needed basis.

* * * * *